I. P. WHITAKER.
MUD SCRAPER.
APPLICATION FILED JULY 12, 1907.
904,388.
Patented Nov. 17, 1908.
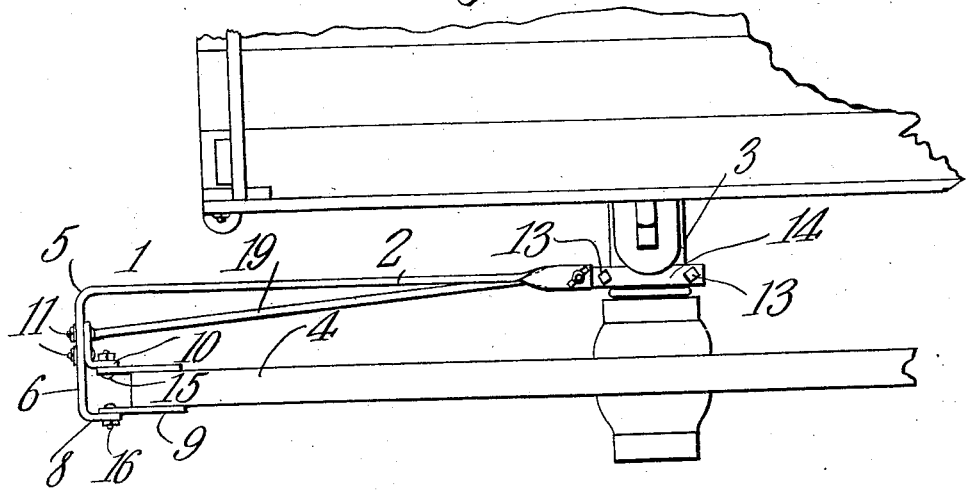
Fig. 1.
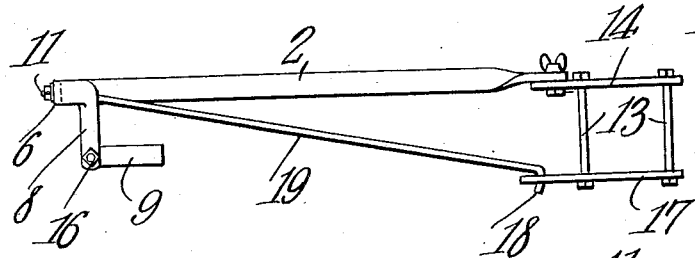
Fig. 2.
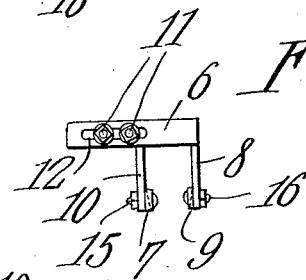
Fig. 3.
Fig. 4.
Ira P. Whitaker,
INVENTOR.
WITNESSES:
By C. A. Snow & Co.
ATTORNEYS

UNITED STATES PATENT OFFICE.

IRA PASCHAL WHITAKER, OF ALVORD, TEXAS.

MUD-SCRAPER.

No. 904,388.

Specification of Letters Patent.

Patented Nov. 17, 1908.

Application filed July 12, 1907. Serial No. 383,505.

*To all whom it may concern:*

Be it known that I, IRA P. WHITAKER, a citizen of the United States, residing at Alvord, in the county of Wise and State of Texas, have invented a new and useful Mud-Scraper, of which the following is a specification.

This invention relates to an attachment for vehicles and is designed to prevent mud from collecting on the wheels during the progress of the vehicle along poorly constructed roads.

The object of the invention is to provide a simple and efficient mud scraper which may be removably attached to a vehicle axle, having scraping blades applied to both sides of a wheel felly and adjustably attached so as to apply them at the most efficient angle for removing mud from the wheel. The inner blade is adjustably secured on the scraper to accommodate the device to wheels having rims of different widths.

In the accompanying drawings: Figure 1 is a plan view of a portion of a wagon with the improved wheel scraper applied thereon. Fig. 2 is a side view of the scraper detached. Fig. 3 is a rear view of the same. Fig. 4 is a perspective view of the inner scraping blade.

Similar numerals are used on all the figures for the same parts.

The mud scraper, indicated generally by the numeral 1, comprises a straight portion or arm 2, extending from near the vehicle axle 3 to a point in rear of the wheel 4 where it is given a short bend 5 to form a support 6, for the inner blade 7 parallel to the axle 3 and extending outwardly behind and past the wheel. The outer end of the support 6 is fashioned into a downwardly extending bracket 8, to the lower end of which the outer scraper blade 9 is bolted or otherwise fastened. The inner scraper blade 7 is attached to an adjustable bracket 10 by bolts 11 which pass through a slot 12 in the support 6. Fastened to the upper and lower sides of the rear axle 3 by vertical bolts 13 are two plates 14 and 17, the lower plate 17 projecting rearwardly from the axle 3 a greater distance than the upper plate 14. The lower plate 17 has a vertical opening near its end in which is seated a hook 18 on the end of a rod 19 which serves as a brace arm and is carried rearwardly and fastened to the support 6, forming one of the bolts 11. The arm 2 carries a thumb screw at its forward end to engage an aperture in the rear end of the plate 14. The clip formed by the plates 14 and 17 and the bolts 13 remain on the axle so that to attach the scraper it is only necessary to engage the hook 18 in the eye in the plate 17 after setting the scrapers proper on each side of the wheel; then by drawing the arm 2 over the end of the plate 17 and fastening it there, the device will be rigidly secured in place. The width of tire is provided for by the bolt and slot connection of the bracket 10 carrying the inner blade, and finally the angular set of the scraping blades 7 and 9 is secured by loosening the bolts 15 and 16 which secure said blades to their respective brackets.

A mud scraper constructed as above described is simple and inexpensive, and can be quickly applied to a vehicle without trouble. It is also efficient in service, removing all loose mud from the side of a wheel felly and so prevents it falling on the hub and axle, soiling the vehicle and getting in the wheel bearing.

Having thus described the invention what is claimed is:—

1. A mud scraper comprising a main arm adapted to be connected at one end to the axle of a vehicle and having its other end bent outwardly to pass behind a wheel, and a pair of scrapers each independently projecting across and overlapping the rim of the wheel in a horizontal plane and pivotally supported on the outwardly bent end of said arm to permit angular adjustment thereof in vertical planes from a horizontal plane one of said scrapers being also laterally adjustable in a straight line.

2. A mud scraper comprising a main arm adapted to be detachably connected at one end to the axle of a vehicle and having its other end bent outwardly to pass behind a wheel, a bracket bolted to the outwardly bent end of said arm and laterally adjustable thereon, and two scrapers each independently projecting across and overlapping the rim of the wheel in a horizontal plane, one pivotally attached to said outwardly bent portion of the arm and the other similarly secured to said bracket to permit of their angular adjustment in vertical planes from a horizontal plane.

3. A mud scraper comprising a clip permanently fastened to a vehicle axle, a main arm adapted to be removably attached at one end to said clip and having its other end bent outwardly to pass behind a wheel, a bracket fastened to the outwardly bent end of said arm and laterally adjustable thereon, a brace rod detachably connected to said clip and to said outwardly bent end of the main arm said brace arm forming one of the fastenings for said bracket, and two scrapers one pivotally attached to the bracket and the other similarly secured to said main arm to permit angular adjustment thereof in vertical planes.

In testimony that I claim the foregoing as my own, I have hereto affixed my signature in the presence of two witnesses.

IRA PASCHAL WHITAKER.

Witnesses:
  ORAN SPEER,
  JNO. A. MILLER.